Patented Aug. 18, 1942

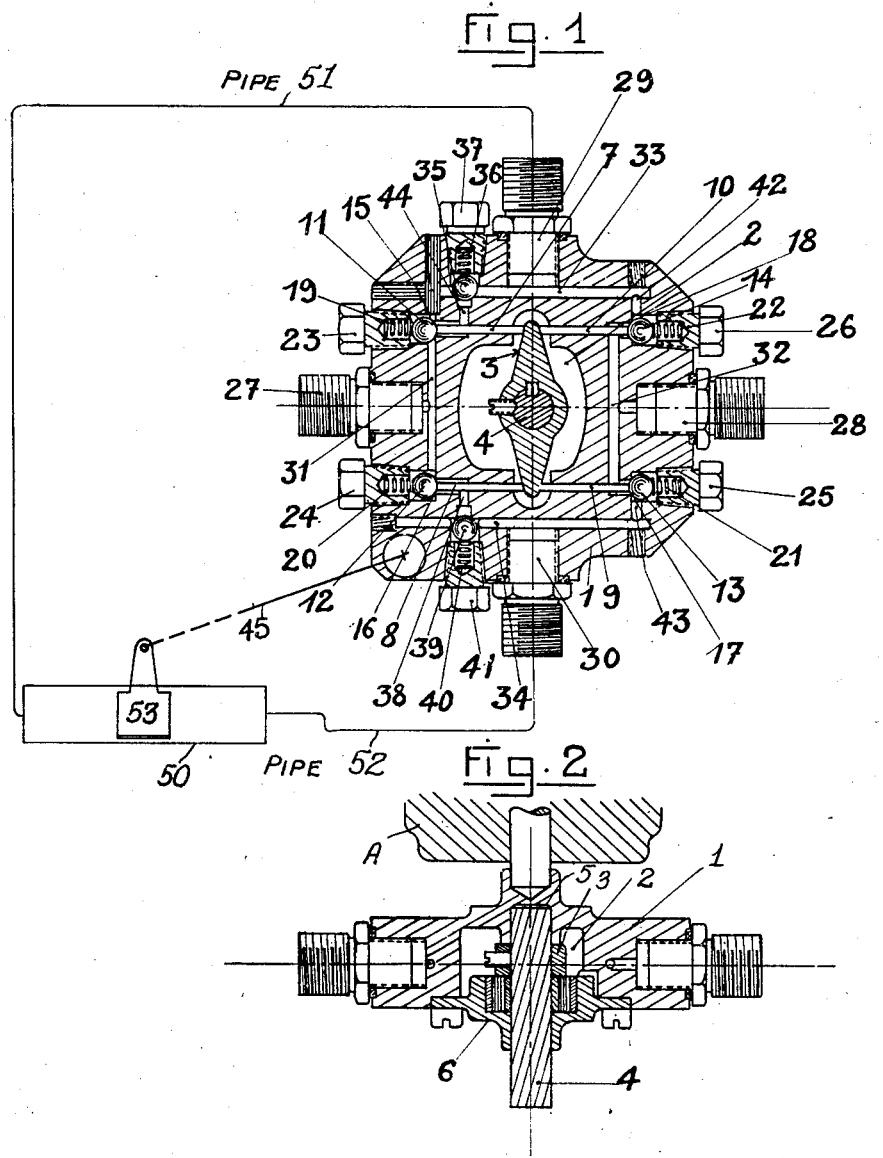

2,293,555

UNITED STATES PATENT OFFICE 2,293,555

DISTRIBUTOR FOR FLUID OPERATED APPARATUS

Jean Mercier, Neuilly-sur-Seine, France

Application June 29, 1939, Serial No. 281,862
In Great Britain July 8, 1938

1 Claim. (Cl. 121—41)

The present invention relates to distributors for controlling the working of fluid pressure operated systems.

The object of the present invention is to provide a distributor of this kind which is better adapted to meet the requirements of practice than those used for the same purpose up to the present time.

According to an essential feature of the invention, the distributor includes a control member constituted by a cam mounted on an axis and a distributor body also movable about the same axis connected mechanically with the movable elements to be operated in such manner that said elements, when actuated, move the body of the distributor with respect to the fixed support on which both said distributor body and said cam are pivotally mounted, in such manner as to bring back said parts into their initial neutral position.

Other features of the present invention will result from the following detailed description of a specific embodiment thereof.

A preferred embodiment of the present invention will be hereinafter described, with reference to the accompanying drawing, given merely by way of example, and in which:

Fig. 1 is a sectional plan view of a distributor device made according to the present invention;

Fig. 2 is a corresponding sectional side elevation.

In the embodiment described the distributor is intended to supply two apparatus or elements to be operated. It comprises a distributor body 1 pivotally mounted on a fixed frame A and provided with a hollow space 2 in which is provided a cam 3 movable about the axis of a spindle 4 on which it is keyed. This spindle 4 is journalled in a bearing 5 provided in body 1 and in a bearing provided in a member 6 fixed to body 1. Cam 3 operates a series of push rods 7, 8, 9, 10 which act on balls 11, 12, 13, 14 which, under the action of springs 19, 20, 21, 22, respectively, normally close conduits opening at 15, 16, 17, 18. The action of said springs is adjusted by means of screws 23, 24, 25, 26, respectively. The distributor comprises a main inlet pipe 27 and a main outlet pipe 28 and two fluid supply pipes 29 and 30 leading to the elements or apparatus to be operated. Pipe 27 communicates with a passage 31; pipe 28 communicates with a passage 32; pipe 29 communicates with a passage 33 and pipe 30 with a passage 34. Passage 31 communicates with passage 33 through a bent channel 44 closed at one end by a ball 11 and at the other end by one of the balls above mentioned, to wit 35 pushed by a spring 36, the tension of which is regulated by a screw 37, this ball and this spring forming a check valve. Passage 31 communicates with passage 34 through a channel 38 closed at one end by ball 12 and, at the other end, by a ball 39 pushed by a spring 40 the tension of which is adjusted by means of a screw 41, this ball 39 with its spring acting as a check valve. Passage 32 communicates with passages 33 and 34 through channels 42 and 43.

The operation of the distributor is as follows: The cam having been displaced in the anti-clockwise direction, balls 11 and 13 are lifted from their seats, balls 12 and 14 remaining pressed on their seats. The fluid entering at 27 passes into the passage 31; it is stopped at 16, but flows through 15 into channel 44 and passage 33, lifts ball 35 from its seat and fills conduit 33 as far as 18. The fluid is thus fed under pressure to conduit 29. At the same time the fluid contained in the element to be operated which is connected to pipe 30 flows into conduit 34, passes through 42 into conduit 32 ball 13 being lifted from its seat 17 and then flows to 28. Thus when the cam is turned in the anti-clockwise direction fluid under pressure is fed to one of the apparatus to be controlled and the other apparatus is simultaneously connected with the exhaust. Inversely, when the cam is turned in the opposite direction the first apparatus has its passages connected to the exhaust and the second receives the fluid under pressure.

The use of balls for closing the fluid circulation passages within the distributor has, with respect to the known devices including slide valves or of a port covered or uncovered by a sliding member, the advantage of reducing the play or clearance, which permits a more accurate adjustment.

According to the essential feature of the invention, the element to be operated by the fluid pressure controlled by the distributor above described (this element consisting for instance of an aileron of an aeroplane, not shown, controlled by a servo-motor, such as a jack 50) is connected through a link 45 with body 1. For instance, as shown by the drawing, while conduits 29 and 30 lead to both sides of the cylinder of said jack, through pipes 51 and 52, respectively, the piston 53 is mechanically connected to a link 45 pivoted to body 1. The mechanical connection is such that, when undergoing the movement which is to be produced by the feed of fluid under pressure through one of the passages 29 and 30, the element in question (that is to say piston 53, which is movable therewith) produces a rotation of body 1 about the axis of spindle 4, of the same amplitude and in the same direction as the movement precedingly imparted to control member 3. Thus member 3 and body 1 are restored into their initial neutral relative positions, and the feed through 29 is stopped.

Of course while the distributor described has been provided to supply two apparatus, without departure from the scope of the invention there could be produced such a distributor for the supply of more than two apparatus, of two series of apparatus for example.

Having now described my invention, what I claim as new and desire to secure by Letters Patent is:

In a structure including a fixed frame and a fluid pressure operated element movable with respect thereto, the combination of a valve body pivoted to said frame about an axis, having an inlet fed with fluid under pressure, and an outlet, and fluid conduits leading to both sides of said movable element, respectively, for operation thereof, said body being further provided with passages inter-connecting said inlet and outlet on the one hand and said fluid conduits, valve means in said body adapted to connect one of said passages with said inlet and the other with said outlet, alternately, a control member pivoted to said body about the same axis, adapted, when moved from neutral position, to operate said valve means in either direction, and mechanical means interposed between said movable element and said body adapted, upon movement of said element with respect to said frame, resulting from a pivoting of said control member with respect to said frame in one direction, from neutral position, to cause said body to pivot with respect to said frame in the same direction, to restore said body and said control member into the initial neutral position with respect to each other.

JEAN MERCIER.